United States Patent [19]

Bailey

[11] 3,725,770

[45] Apr. 3, 1973

[54] STARTING CIRCUITRY FOR SERIES/PARALLEL COMPENSATED, CURRENT-FED INVERTER

[75] Inventor: Ronald B. Bailey, Waynesboro, Va.

[73] Assignee: General Electric Company, Philadelphia, Pa.

[22] Filed: July 25, 1972

[21] Appl. No.: 274,895

[52] U.S. Cl. ................................. 321/45 R, 321/18
[51] Int. Cl. ................................................ H02m 7/48
[58] Field of Search ............. 321/2, 9, 18, 45, 45 C

[56] References Cited

UNITED STATES PATENTS

| | | | |
|---|---|---|---|
| 3,118,105 | 1/1964 | Relation et al. | 321/9 R X |
| 3,378,751 | 4/1968 | Walker | 321/18 X |
| 3,504,264 | 3/1970 | Suelzle | 321/2 |
| 3,506,907 | 4/1970 | Porterfield et al. | 321/45 S |
| 3,684,936 | 8/1972 | Graf | 321/45 C X |

Primary Examiner—William M. Shoop, Jr.
Attorney—J. Wesley Haubner et al.

[57] ABSTRACT

In a thyristor-composed, current-source, inverter including a series compensating capacitor for supplying energy to a tank load, means are provided for starting the inverter from a non-operating state. To that end the compensating capacitor is charged by direct current flowing through a path formed by the conduction of certain inverter thyristors and at the first time after the commencement of such conduction certain other thyristors are rendered conductive to enable the magnitude of the direct current to build up. At a second time after the commencement of conduction of said other thyristors, alternate triggering of the inverter thyristors is commenced and alternating current flows through the load. The voltage on the compensating capacitor commutates inverter current until the load is charged sufficiently to commutate current on its own.

5 Claims, 3 Drawing Figures

STARTING CIRCUITRY FOR SERIES/PARALLEL COMPENSATED, CURRENT-FED INVERTER

BACKGROUND AND OBJECTS OF THE INVENTION

The present invention relates to electric power apparatus useful for supplying high-frequency alternating current to "tank" loads, and more particularly it relates to means for effectuating reliable starting of current-fed, high-frequency inverters.

The following art now known to applicant is indicative of prior art approaches in this area of technology: U.S. Pat. No. 2,009,788 (Sabbah); U.S. Pat. No. 2,652,528 (Demontvignier); and U.S. Pat. No. 3,599,078 (Pelley).

A "tank" load as used herein refers to a load circuit comprising the combination of resistance, inductance and capacitance. One example is a parallel-tuned circuit formed by connecting a bank of capacitors across an induction heating coil. Although the coil itself is highly inductive, the load circuit will nevertheless exhibit near the unity power factor as a result of suitable dimensioning of the parallel capacitance. Such tank loads in their high-frequency A-C power supplies are well known in the induction heating art.

With the commercial development of high-power, solid-state controlled switching elements (often referred to as thyristors), there has been a growing interest in designing reliable and efficient static conversion apparatus employing such components for the purpose of supplying high-frequency alternating current in industrial heating applications.

The basic concept is to use a power inverter in tandum with a power rectifier. The rectifier converts readily available three-phase alternating current at a fixed, main frequency (e.g., 60 hz.) into unidirectional current. A smoothing inductor is connected between the rectifier and the inverter to smooth a D-C output of the rectifier and provide continuous D-C current to the inverter. The inverter changes the direct current into single-phase alternating current of controllable, high-frequency (e.g., 100 to 4,000 hz.) and supplies it to a tank load. This type of an inverter is referred to in the art as a current-fed, parallel-compensated inverter.

Parallel compensated inverters belong to the family of load commutated inverters and are well known to persons skilled in the art, as evidence by the above noted prior art patents of Sabbah and Demontvignier. When the respective load-current carrying thyristors of the inverter are cyclically triggered in a predetermined sequence and at a desired rate, the direction of current that is fed to the load circuit will alternate at a frequency determined by the triggering rate. With a square wave of current being thus switched into the tank load, an alternating voltage of sinusoidal wave form is developed thereacross.

In order for each thyristor to turn off at the end of its desired conducting period, it needs to be subjected to a reverse voltage following conduction for an interval at least as long as the characteristic turn-off time of the device. In load-commutated inverters, this requires that the switching action occur in advance of the zero-crossing of the load voltage by an electrical angle whose time duration, at maximum operating frequency, is longer than the aforesaid turn-off time. Toward that end, the load circuit should be tuned to have a leading power factor characteristic. This can be accomplished by suitably dimensioning the parallel capacitance in the tank load.

As is known, current-fed, parallel-compensated inverters cannot be started from a non-operating ("cold") state by simply triggering their thyristors at a desired rate since the load is initially uncharged and insufficient voltage will build up thereacross to effectuate commutation upon attempting to start the inverter. Furthermore, when starting from the deenergized state misoperation might result if the period of time between successive switchings of the respective thyristors were too short to permit the direct current supplied to the inverter via the smoothing choke to build up to a level that is continuously above the inherent holding level of the inverter thyristors during the interval that conduction thereof is required. In view of these characteristics, auxiliary "start-up" circuitry has heretofore been proposed for starting current-fed, parallel-compensated inverters.

Inverters utilizing a compensating capacitor connected in series with a tank load are sometimes referred to in the art as series/parallel compensated inverters. In accordance with the prior art, the start up of such inverters can also be assisted by auxiliary starting circuitry although start up is accomplished much more readily than start up of a parallel compensated inverter. During start-up of a series/parallel compensated inverter the series connected compensating capacitor provides most of the commutation energy until the load is sufficiently charged to effectuate commutation on its own.

The use of auxiliary starting circuits for effectuating starting of a series/parallel compensated inverter leaves much to be desired since such circuits add to the manufacturing expense and are only used during the starting sequence when the operation of the inverter changes from its non-operating or "OFF" state to steady state operation. Furthermore, starting techniques utilizing auxiliary starting circuitry may not be well suited to a wide range of load conditions which may exist in an electrical system to which the inverter is connected.

Accordingly, it is a general object of my invention to provide a thyristor-composed, series/parallel compensated, current-fed inverter which can be readily started from a non-operating state without requiring auxiliary starting circuitry.

It is a further object of my invention to provide an improved and low cost technique for starting a thyristor-composed, series/parallel compensated, current-fed inverter.

SUMMARY OF THE INVENTION

In accordance with one aspect of my invention I provide an inverter comprising a first, second, third and fourth thyristors which are connected to form a bridge circuit having a first and second input terminals connected across a source of direct current and a first and second output terminals. The inverter is arranged to provide alternating current to a subcircuit including a tank load and a series connected compensated capacitor, which subcircuit is connected between said output terminals. To that end, the odd numbered thyristors and the subcircuit comprise a first path enabling current to flow through the load in one direction and the even numbered thyristors and the subcircuit comprise a second path enabling current to flow through the load in the opposite direction. My starting technique entails rendering the thyristors of the second path conductive in response to an ON command to enable direct current to charge the series compensating capacitor, followed by rendering conductive one thyristor of the first path and one thyristor of the second path to provide an auxiliary path through which said direct current can flow and increase in magnitude without affecting the charge on the series compensating capacitor and, subsequent to this action, alternately rendering conductive the odd and even numbered thyristors at a desired frequency starting with the odd numbered thyristors, whereupon said direct current begins flowing alternately through said first and second paths to provide alternating current to the load. The commutation of direct current from one path to the other is effected by the voltage appearing on the series compensating capacitor until the tank load is charged sufficiently to effectuate commutation on its own.

BRIEF DESCRIPTION OF THE DRAWING

My invention will be better understood in its various objects and advantages will be more fully appreciated from the following description taken in conjunction with the accompanying drawing in which.

DETAILED DESCRIPTION OF THE PREFERRED EMBODIMENT

Figure 1:
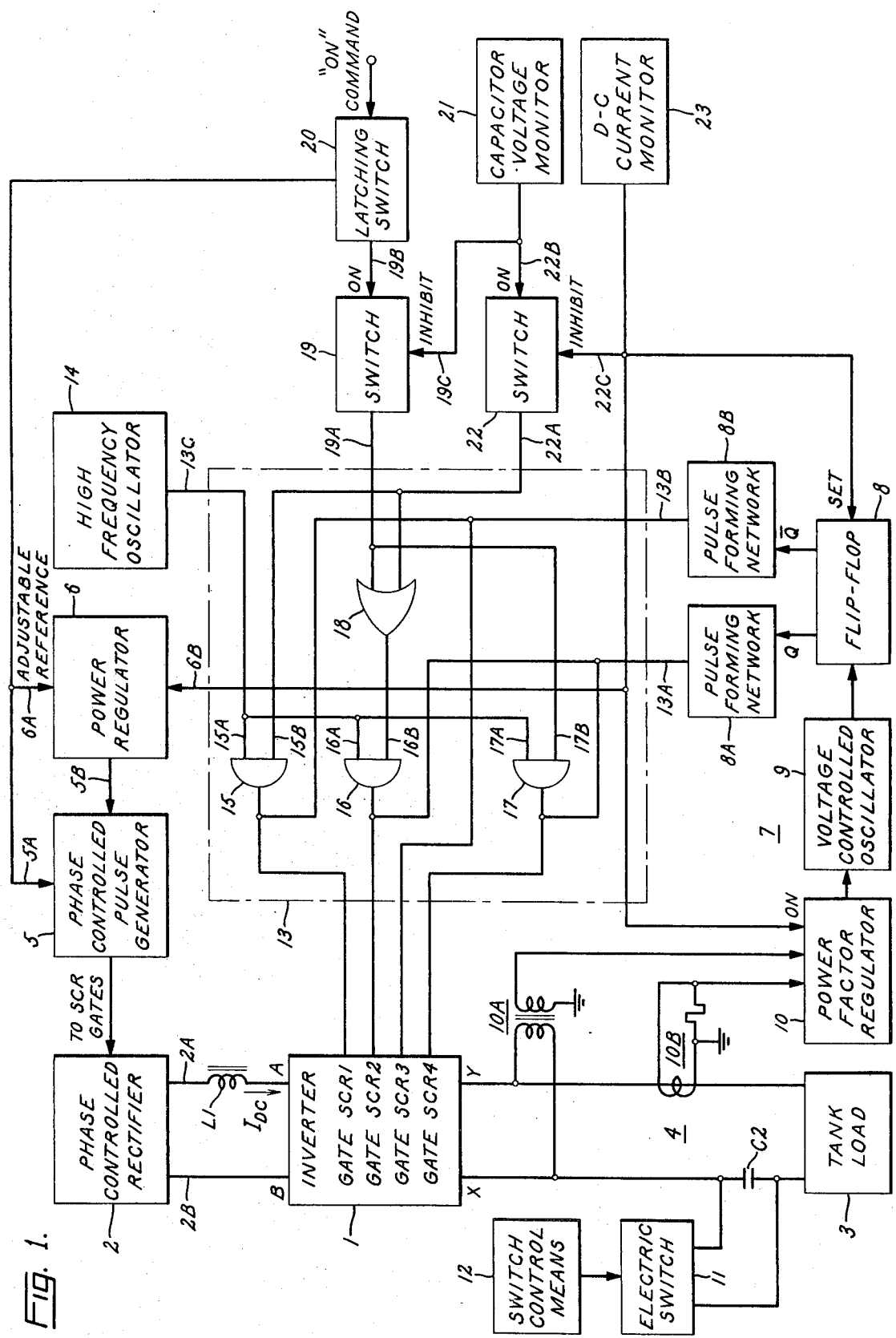
FIG. 1 is a schematic-functional block diagram of an inverter and associated circuitry in accordance with my invention.

Referring to FIG. 1 a variable frequency, current-fed, inverter 1 is coupled to a rectifier 2 and is adapted for converting the direct current output of the rectifier into alternating current and for supplying the alternating current to a tank load 3.

Figure 2:
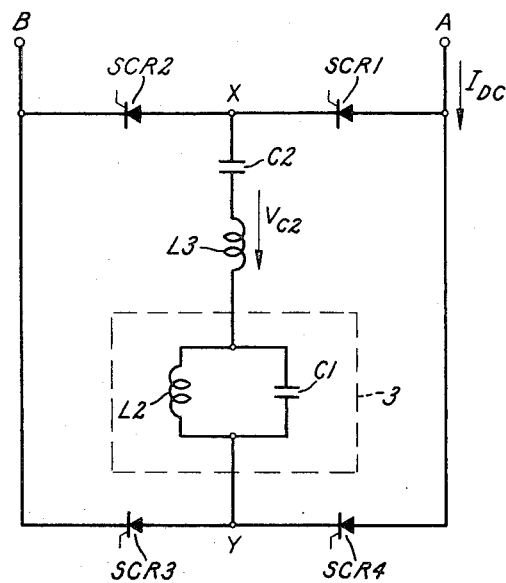
FIG. 2 is a schematic diagram of the inverter shown in FIG. 1.

As can be seen in FIG. 2 tank load 3 includes an inductor L2 (which may represent an induction heating coil) shunted by a parallel compensating capacitor C1.

The inverter includes a pair of input terminals A and B, terminal A being coupled via a smoothing inductor L1 to one D-C output terminal 2A of inverter 2 and terminal B being coupled directly to the other rectifier D-C output terminal 2B. The rectifier 1 and the smoothing inductor L1 form the D-C source for inverter 1. The inverter also includes a pair of output terminals X and Y, across which a subcircuit 4, including a tank load 3 and a series connected compensating capacitors C2, is connected.

Rectifier 2 is a phase-controlled rectifier which typically comprises 6 thyristors or SCR's (not shown) interconnected to form a six-pulse bridge connected rectifier. The average value of the voltage of the D-C output across the terminals 2A and 2B is a function of the firing angle at which the respective thyristors are triggered. To that end the rectifier thyristors are triggered in response to suitable signals from a phase controlled pulse generator 5. The delay angle at which the generator supplies gate pulses to the rectifier SCR's is controlled by two input signals, namely, 5A and 5B, provided thereto. Signal 5A is provided in response to an "ON" command when the system shown in FIG. 1 is energized from its non-operating or "OFF" state, and under its control the pulse generator 5 causes the rectifier 2 to provide 20 to 30 percent of its full rated average output voltage to inverter 1 for a reason to be described later. A power regulator 6 establishes the magnitude of the output voltage of the rectifier 2 during the steady state operation of the inverter. To that end it provides the signal 5B the magnitude of which establishes the desired steady state output voltage magnitude (e.g., 100 percent of full rated voltage). Signal 5B can be varied by adjusting the magnitude of an adjustable reference signal 6A.

The output of rectifier 2 consists of a D-C voltage including a 360 hz. ripple. The smoothing inductor L1 is coupled to the rectifier output terminals to smooth the rippled output current so as to provide a constant direct current, denoted as $I_{DC}$, to the inverter 2.

As can be seen inverter 2 is a series/parallel compensated inverter (i.e., it includes a compensating capacitor connected in series with a parallel compensated load connected across its output terminals), and it is formed by appropriately interconnecting and cyclically triggering in a prescribed sequence a plurality of main switching elements (e.g., thyristors). To that end inverter 2 comprises four thyristors, SCR1, SCR2, SCR3 and SCR4.

As can be seen in FIG. 2 the cathode of SCR1 is connected to the anode of SCR3 via the subcircuit 5 including a low capacitance value, series compensating capacitor C2, and inductor L3 (which represents the line inductance of the inverter output) and load 3. The series connection of SCR1, capacitor C2, inductor L3, load 3 and SCR3 forms a first main current path through which $I_{DC}$ will flow when the path thyristors are rendered conductive. As can be seen the cathode of SCR4 is connected to the anode of SCR2 via subcircuit 5. The series connection of SCR4, subcircuit 5 and SCR2 forms a second main current path through which $I_{DC}$ will flow when the path's thyristors are rendered conductive. By alternately triggering the even and odd numbered thyristor pairs at a prescribed frequency, the direct current will be made to cyclically change directions through the load to establish alternating current therein. The frequency of the alternating load current will depend upon the rate at which the thyristors forming the current paths are triggered.

The rate at which the inverter thyristors are alternately triggered is established by control means 7 like that shown and claimed in my copending U.S. patent application, Ser. No. 162,430 filed on July 14, 1971. As disclosed therein the rate at which the inverter thyristors are triggered is automatically adjusted to ensure that the load power factor remains at a constant prescribed value irrespective of changes in the load. To that end control means 7 includes pulse forming networks 8A and 8B connected to the respective Q and $\overline{Q}$ outputs of a flip-flop 8. The pulse forming network 8A is coupled to the gate electrodes of SCR's 2 and 4 and the pulse forming network 8B is coupled to the gate electrodes of SCR's 1 and 3. When arranged in this manner the even and odd numbered thyristors of the inverter will be alternately triggered by short duration pulses from a train of pulses whose repetition rate is one half of the frequency at which the flip-flop changes states.

The frequency at which the flip-flop changes states is controlled by a voltage controlled oscillator 9. The frequency of the output signals of the oscillator is a function of the magnitude of a signal provided at its input by a power factor regulator circuit 10. The regulator circuit monitors the load voltage via the potential transformer 10A and the load current via current transformer 10B, determines the phase displacement therebetween, compares that phase displacement with a desired phase displacement and provides an output signal, whose magnitude reflects the difference between the actual and the desired phase angles, as the voltage input to the oscillator.

As previously noted parallel-compensated, load-commutated inverters cannot be started "cold" due to the absence of sufficient load voltage to commutate current from one main current path to the other to produce the desired alternating current output. Heretofore, auxiliary circuitry has been utilized to effectuate start up of such inverters.

In accordance with my instant invention start up of a series/parallel compensated inverter can be accomplished through a simple technique of triggering selected inverter thyristors in a special sequence without requiring additional power circuitry. In accordance with the aspect of my invention shown in the drawings this technique entails the following: In response to an "ON" command (given at a time when the rectifier 1 and the inverter are in their non-operating, "OFF" state) the thyristors SCR2 and SCR4 are rendered conductive to form a conductive path. Since the compensating capacitor and the load are connected in the conducting path provided by SCR2 and SCR4, the passage of direct current therethrough charges the capacitor. Due to the presence of the smoothing inductor L1 the magnitude of direct current flowing through the path builds up slowly. When the voltage on the series compensating capacitor attains a preselected level one thyristor from said one conductive path and one thyristor from the conductive path formed by SCR1 and SCR3 are rendered conductive. As a result of this action the voltage on the compensating capacitor reverse biases the other heretofore conducting even numbered thyristor path to turn it off. Furthermore the conduction of one thyristor from each of the aforesaid conducting paths produces an auxiliary conducting path through which the direct current from the rectifier begins flowing. The direct current continues to flow through the auxiliary path until it has built up to a magnitude above the inherent holding current level of the inverter thyristors at which time the odd and even numbered thyristors are alternately triggered, starting with the odd numbered thyristors. In response to the receipt of trigger signals to their gate electrodes the odd numbered thyristors turn on and the voltage to which the compensating capacitor had previously been charged appears on the heretofore conducting even numbered thyristor in the reverse direction whereupon said even numbered thyristor turns off. This action enables the current to flow through the load via the path formed by the odd numbered thyristors. When the even numbered thyristors are thereafter triggered the voltage then appearing on the compensating capacitor will reverse bias both of the odd numbered thyristors, whereupon the odd number thyristors will turn off as the even numbered thyristors turn on and current will flow through the load via the path formed by the even numbered thyristors. The current will reverse directions in the load each time that the odd and even numbered thyristors switch conducting. The voltage which appears on the series compensating capacitor is effective during the initial start up operation of the inverter to commutate current from one conducting path to the other until the voltage on the load builds up to a magnitude sufficient to effectuate commutation on its own.

Figure 3:
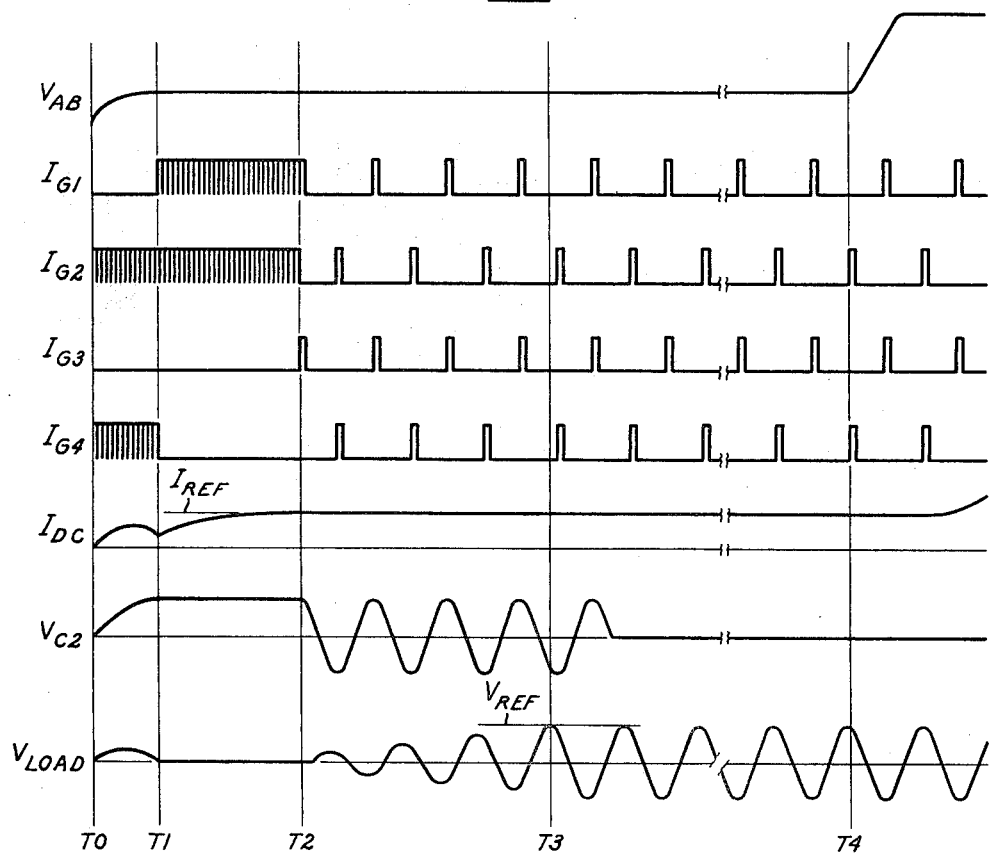
FIG. 3 is a graphical representation of current and voltage wave forms at various points in the system shown in FIG. 1.

The graphs of FIG. 3 show currents and voltages in various parts of the system shown in FIG. 1 as the rectifier and inverter change from their non-operating "OFF" state to steady state operation.

At time T0 an "ON" command is provided to cause inverter 2 and rectifier 1 to commence operation. At time T0 the output voltage $V_{ABT0}$ of rectifier 2 begins increasing from 0 volts to a level which is equal to 20 to 30 percent of its steady output level. This low level precludes excess voltage from building up on the compensating capacitor during starting. Also at time To high frequency signals from means to be described later are provided to the gate electrodes of SCR2 and SCR4. These signals are shown in FIG. 3 and are denoted as $I_{G2}$, $I_{G4}$, respectively. In response to these signals SCR2 and SCR4 begin conducting direct current, denoted as $I_{DC}$, from rectifier 2 through the path consisting of SCR2, load 3, inductor L3, series compensating capacitor C2 and SCR4. This direct current charges up capacitor C2 to a predetermined voltage whose polarity is shown by the arrow denoted as $V_{C2}$ in FIG. 2 At the time, denoted at T1, that the voltage $V_{C2}$ attains the preselected level, high frequency signals are provided to the gate electrodes of SCR1 and SCR2, whereupon SCR2 continues conducting and SCR1 begins conducting. THe voltage $V_{C2}$ appearing on a series compensating capacitor C2 reverse biases SCR4 and it turns off. The conduction of SCR1 and SCR2 provides an auxiliary path through which current, $I_{DC}$, is diverted. Since current $I_{DC}$ is not flowing through capacitor C2 the voltage thereon will remain at the level to which it was charged at time T1. Owing to the inductance of the smoothing inductor L1, the magnitude of direct current $I_{DC}$ will build up slowly. The auxiliary path composed of conducting SCR's 1 and 2 provides an auxiliary path through which $I_{DC}$ can flow until it has built up to a sufficient level. This level is shown in FIG. 3 as reference level $I_{REF}$. At the time, denoted as T2 that $I_{DC}$ has reached the reference level, alternate triggering of the odd and even numbered thyristors by the flip-flop 8 and its associated pulse forming networks 8A and 8B commences, starting with the triggering of the odd numbered thyristors. The means for providing the short duration pulses produced by the pulse forming networks will be described later. THe frequency at which the alternate triggering of the odd and even numbered thyristors occurs is determined by the frequency at which flip-flop 8 changes states as is explained in my aforenoted patent application, and, during the initial operation of the inverter is the maximum operating frequency of the voltage controlled oscillator 9.

At time T2 the conduction of SCR1 and SCR3 effectively places the voltage appearing on series compensating capacitor C2 on the heretofore conducting SCR2 in the reverse direction. This action causes SCR2 to turn off. Furthermore, the conduction of SCR1 and SCR3 provides a first main conducting path through which load current can flow. The voltage appearing on the load is shown in FIG. 3 and is denoted as $V_{XY}$. As can be seen at time T2 the voltage $V_{XY}$ begins to build up as the load is charged. The current flowing through capacitor C2 via the conducting thyristors SCR1 and SCR3 subsequent to T2 causes capacitor C2 to begin to discharge from its previously positively charged state. At the time when the voltage on the capacitor becomes negative, current will still flow through the path made up of SCR1 and SCR3. A short time thereafter short duration trigger pulses are provided to the gate electrodes of SCR2 and SCR4, whereupon SCR2 and SCR4 begin conducting and at the same time the negative voltage on capacitor C2 causes SCR1 and SCR3 to turn off. This action results in current flowing in the load in the opposite direction as the direction of current flow when SCR1 and SCR3 were conducting and capacitor C2 begins to discharge (i.e., charge in the positive direction). The above described alternate triggering of SCR1 and SCR3 and SCR2 and SCR4 continues in the above described manner hereinafter to provide alternating current to the load so long as operation of the inverter is desired. When the voltage to which the load is charged reaches a predetermined level (which is sufficient to effectuate commutation without the utilization of capacitor C2), denoted as Time T3 and shown in FIG. 3 as occurring after three cycles of load voltage $V_{LOAD}$, means in accordance with that disclosed and claimed in my copending U.S. Patent application Ser. No. 274,896, clamps the voltage appearing on the capacitor C2 to a very low magnitude. Those means include an electric switch 11 connected in shunt with the capacitor C2 and control means 12 which causes the switch to clamp the voltage on the capacitor. As can be seen, subsequent to time T3 the voltage $V_{C2}$ appearing on capacitor C2 is clamped at approximately 0 volts. This action prevents excess voltage from being developed on the low capacitance value compensating capacitor.

Between the time T2 and a subsequent time denoted as T4, the power factor regulator and associated circuitry will have adjusted the frequency at which the inverter thyristors are triggered to produce the desired power factor angle. At time T4 the power regulator 6 will provide signal 5B to the pulse generator 5 to advance the firing angle of the trigger signals provided to the thyristors forming phase controlled rectifier 2 to raise the average value of its output voltage to a level established by adjustable reference signal 6A.

The sequence of thyristor triggering subsequent to time T2 is denoted as the alternate triggering sequence and the sequence between time T0 and T2 as the preliminary triggering sequence. The interval of time between T0 and time T3 is denoted as the start-up interval and is the period during which the inverter is operating in its start-up mode. Inverter operation subsequent to time T3 denoted as steady state operation. The use of the term steady state operation refers to the condition wherein the load is charged sufficiently to effectuate continued current commutation on its own and is not dependent upon whether or not the inverter is supplying full rated power to the load (as may be the case after the time T4).

In the presently preferred embodiment of my invention; the preliminary and alternate triggering sequences of the inverter are effectuated by the means shown in FIG. 1.

As previously noted the alternate triggering signals (i.e., the short duration pulses) for the inverter SCR's are supplied from the control means 7. These signals are provided as inputs to a distribution circuit 13. The distribution circuit is effective during the alternate triggering sequence for supplying the short duration trigger pulses from the pulse forming network 8A to the gate electrodes of inverter thyristors SCR2 and SCR4 and for supplying the short duration trigger signals from the pulse forming network 8B to the gate electrodes of SCR1 and SCR3. During the preliminary triggering sequence the distribution circuit is effective for supplying high frequency unipolarity pulses from a free running high frequency oscillator 14 first to SCR's 2 and 4 and then to SCR's 1 and 2. The alternate triggering sequence trigger signals are provided at distribution circuit input terminals 13A and 13B and the preliminary sequence trigger signals are provided at distribution circuit input terminal 13C.

As can be seen the distribution circuit includes three AND gates, namely, 15, 16 and 17. The output of gate pulse forming 15 and network 8B are connected together and coupled to the gate electrode of SCR1. The output of gate 16 and pulse forming network 8A are connected together and coupled to the gate electrode of SCR2. The output of network 8B is coupled to the gate electrode of SCR3 and the outputs of gate 17 and network 8A are connected together and are coupled to the gate electrodes of SCR4.

Gates 15, 16 and 17 control the preliminary triggering sequence. To that end gates 15, 16 and 17 include input terminal 15A, 16A and 17A, respectively, which terminals are connected together to the distribution input terminal 13C. Distribution terminal 13C is in turn connected to the output of the high frequency oscillator 14. The AND gates 15, 16 and 17 also include control terminals 15B, 16B and 17B, respectively. Whenever the control terminal of any of the gates 15, 16 or 17 is provided with a control signal the high frequency input pulse which is provided at its input terminal by oscillator 14 will appear at its output terminal and will be coupled to the gate electrodes of its associated inverter SCR.

The pulse forming networks 8A and 8B control the alternate triggering sequence. Whenever short duration pulses are supplied from the pulse forming network 8B they will be coupled to the gate electrodes of their associated inverters SCR1 and SCR3, respectively. Whenever short duration pulses are provided from the pulse forming network 8A they will be coupled to the gate electrodes of their associated inverters SCR2 and SCR4, respectively.

The control signals for AND gate 16 is provided via a two-input OR gate 18. One input of the OR gate is provided by the output of a controllable electric switch 19. Switch 22 is adapted for providing a control signal at its output terminal 19A in response to the provision of an ON signal at its input terminal 19B. No control signal appears at output terminal 19B when there is an "inhibit" signal on the switch's inhibit terminal 19C irrespective of whether or not there is an ON signal at its input terminal. The output of switch 19 is also provided as the control input 17B for AND gate 17. The input to switch 19 is provided by a latching switch 20. Latching switch 20 is operative in response to an "ON" command (which can be provided either manually or automatically) for latching into the state wherein it provides an ON signal to the input of switch 19. In response to the ON command switch 20 also provides a signal 5A to the gate pulse generator 5 to initiate operation of the pulse controlled rectifier 2 at 20 to 30 percent of its rated output voltage.

The inhibit input 19C of switch 19 is connected to the output of a capacitor voltage monitoring circuit 21. This circuit is operative for monitoring the magnitude of the voltage of capacitor C2 and providing an output signal whenever the voltage appearing on the capacitor has attained a preselected level which is sufficiently high to effectuate inverter current commutation. THe time at which circuit 21 provides such an output signal has been denoted as time T1. The output signal of the monitoring circuit 21 is also provided as an input 22B to a second controllable electric switch 22. Switch 22 is constructed and operates in a manner similar to switch 19 and includes an output terminal 22A and an inhibit terminal 22C. The output terminal 22A is connected to the second input of OR gate 18 and to the control terminal of AND gate 15.

The inhibit input terminal 22C of switch 22 is connected to the output of the DC current monitor 23. The output terminal of the DC current monitor 23 is also connected to a set input of flip-flop 8. Circuit 23 is operative for monitoring the magnitude of direct current $I_{DC}$ flowing through the inductor L1 and for providing an output signal at terminal 22C of switch 22 whenever the magnitude of that current has attained a preselected level (denoted as $I_{REF}$ and shown in FIG. 3) which is sufficiently high to preclude thyristor-current-latching problems and provide continuous DC current. The time that circuit 23 provides an output signal is denoted as time T2. The output of DC current monitor 23 is also provided as an "ON" input at terminal 6B of the power regulator 6 and as an "ON" control input for power factor regulator 10.

Operation of the system shown in FIG. 1 is as follows: Upon receipt of an "ON" command at time T0, latching switch 20 latches in and provides a signal 5A to the phase control pulse generator 5. This signal causes the generator to provide pulses to the gate electrodes of the SCR's forming the phase control rectifier. The phase angle at which the SCR's are gated is established by signal 5A and is such that the average value of the voltage appearing across the rectifier terminals 2A and 2B is approximately 20 to 30 percent of the full rated output voltage of the rectifier.

The latching switch 20 also provides an ON signal to controllable switch 19. Since at time T0 capacitor C2 is uncharged capacitor voltage monitoring circuit 21 will not provide an inhibit signal to inhibit input 19C of switch 19. Therefore, switch 19 will provide an output signal to the control input terminal 17B of AND gate 17 and to one input of OR gate 18. This signal will pass through the OR gate to the control input terminal 16B of AND gate 16.

The free-running, high frequency oscillator 14 provides high frequency pulses to the input terminals of gates 15, 16 and 17. The presence of control signals at the control terminals of gate 16 and 17 enable the high frequency pulses supplied by the oscillator to input terminal 16 and 17 to pass to the gate electrodes of SCR2 and SCR4, respectively. This action enables SCR2 and SCR4 to turn on whereupon direct current $I_{DC}$ begins flowing therethrough and through capacitor C2.

When the voltage appearing on capacitor C2 attains a preselected level (i.e., at time T1), monitoring circuit 21 provides an output signal indicative thereof. This signal is provided to the inhibit terminal 19 of switch 19 which causes the switch to stop providing an output signal to the control inputs of gates 16 and 17. The output signal of monitoring circuit 21 is also provided as an ON input to switch 22. As of time T1 the level of DC current will not have attained the magnitude of $I_{REF}$ and thus switch 25 will not be inhibited. Accordingly, switch 22 will provide an output signal to the control input of AND gate 15 and the second input of OR gate 18. In response to the output signal of switch 22, OR gate 18 provides a control signal to the control terminal of AND gate 16. The presence of control signals at time T1 at the control terminals of AND gates 15 and 16 enables the high frequency pulses supplied from the oscillator at the input terminals 15A and 16A to pass to the gate electrodes of inverter SCR1 and SCR2, respectively. This action enables SCR1 and SCR2 to turn ON.

Upon the conduction of SCR1 and SCR2, the voltage $V_{C2}$ to which capacitor C2 was charged is applied cathode-to-anode on previously conducting SCR4, thereby reverse biasing it and turning it off. The conduction of SCR1 and SCR2 produces an auxiliary path in the inverter 1 through which direct current $I_{DC}$ flows until it is built up to a sufficient magnitude (i.e., equal to $I_{REF}$). As should be apparent the current flowing through the auxiliary path will not affect the charge on capacitor C2.

When the direct current $I_{DC}$ reaches the predetermined level (which time is denoted as time T2) the direct current monitoring circuit 23 provides an output signal indicative thereof to the set terminal of flip-flop 8. This arrangement assures that the first change of state of the flip-flop 8 will trigger SCR1 and SCR3.

During the interval between T0 and T2 flip-flop 8 does not change state since the flip-flop is held in one position by the set input. The pulse forming networks generate a pulse only when the input changes to a high level. Therefore no pulses are generated at 13A and 13B until after the set input of flip-flop 8 is turned on by the DC current monitor 23. Thus, it should be appreciated that flip-flop 8 will not change state until the magnitude of the direct current, $I_{DC}$ attains the predetermined level, $I_{REF}$, at a time when the set terminal of flip-flop 8 is energized. This condition occurs at time T2.

The output signal of DC current monitor 23 is coupled to the inhibit input terminal 22C of switch 22 and to the "ON" input of the power factor regulator 10. Until this time the voltage controlled oscillator 9 has operated at maximum frequency independent of the feedback signals from 10A and 10B. After T2 the flip-flop initially operates at its maximum frequency until it is adjusted by the power factor regulator 10. The inhibit signal at the inhibit input of switch 22 removes the signal appearing at its output. This action causes AND gates 15 and 16 to block the further passage of high frequency signals from oscillator 14 therethrough, thereby precluding further triggering of SCR1 and SCR2 and ending the preliminary triggering sequence.

Since flip-flop 8 is now changing states output pulses are provided at terminals 13A and 13B. The first change of state of the flip-flop generates short duration pulses out of pulse forming network 8B which are applied to the gate electrodes of SCR1 and SCR3 whereupon those SCR's begin conducting. This action signals the beginning of the alternate triggering sequence.

When flip-flop 8 next changes states, network 8A produces short duration pulses which are applied to the gate electrodes of SCR2 and SCR4 whereupon these SCR's begin conducting.

Each time the flip-flop 8 changes states the SCR's forming one main inverter path will turn on and the SCR's forming the other main inverter path will turn off, whereupon alternating current will flow in the load. The voltage which appears on compensating capacitor C2 effectuates the commutation of current from one main inverter path to the other. With each succeeding cycle of alternating voltage flowing through the load the voltage thereon increases until it is of sufficient magnitude (denoted as $V_{REF}$) to effectuate commutation on its own. The point at which this occurs is denoted as time T3. At this time and in accordance with the teaching in my aforenoted copending patent application Ser. No. 274,896 the shunt switch control circuit 12 causes shunt switch 11 to clamp the voltage appearing on compensating capacitor C2 to a very low magnitude.

At the time T2 the output signal from the DC current monitor 23 is provided to the input 6B of power regulator 6. In delayed response thereto (e.g., 0.3 of a second thereafter) the regulator 6 provides an output signal 5B to the gate pulse generator 5. This signal controls the firing angle of the gate pulse supplied to the rectifier 2 so as to increase the average magnitude of its output voltage to a level established by the adjustable reference signal 6A which is provided to the power regulator, thereby increasing the power delivered to the load. The increasing output voltage of the rectifier is shown beginning at time T4 in FIG. 3. The delay with which the regulator responds to the signal from DC current monitor 23 is fixed and is sufficiently long to enable the power factor regulator and its associated circuitry to adjust the frequency of the inverter so that the power delivered to the load is at the desired power factor angle.

While I have shown and described a particular embodiment of my invention, it will be obvious to those skilled in the art that various changes and modifications may be made without departing from my invention in its broader aspects. For example, although the embodiment shown in FIG. 1 utilizes means responsive to the magnitude of system quantities (e.g., $V_{C2}$ and $I_{DC}$) for establishing the moments of time (T1 and T2) at which successive steps of my starting sequence take place, I wish to make it clear that in accordance with my invention I envision the use of a programmed timing device to mark these switching moments, in which case the respective interval T0 – T1 and T1 – T2 would be suitably coordinated with existing system and load parameters.

Therefore, I intend herein to cover all such changes and modifications as fall within the true spirit and scope of my invention.

What I claim as new and desire to secure by Letters Patent of the United States is:

1. In a current source inverter comprising first, second, third and fourth unidirectional switching elements connected in a bridge configuration having first and second input terminals connected across a source of direct current and first and second output terminals connected across a subcircuit including a compensating capacitor in series with a tank load, said first element being connected between the first input terminal and the first output terminal, said second element being connected between the first output terminal and the second input terminal, said third element being connected between the second output terminal and the second input terminal and said fourth element being connected between the first input terminal and the second output terminal, improved control means for causing said inverter to commence operation by rendering said elements conductive in a predetermined order comprising:
   a. first means operative in response to an "ON" command for initially rendering said even numbered elements conductive whereupon direct current flows through said second and fourth elements and commences charging said compensating capacitor;
   b. second means operative subsequently for rendering said first and second elements concurrently conductive, whereupon said direct current is diverted into a path through said first and second elements and said fourth element ceases conducting; and
   c. third means operative after operation of said second means for rendering the odd and even numbered elements alternately conductive at a desired frequency starting with said odd numbered elements, whereupon the prior charge on said capacitor is effective for causing said second element to cease conducting when said odd numbered elements are first rendered conductive by said third means and thereafter alternating current flows through the load.

2. The inverter as specified in claim 1 wherein said second means operates in response to the magnitude of the voltage on said compensating capacitor reaching a predetermined level and wherein said third means first operates in response to the magnitude of the direct current through said first and second elements attaining a predetermined level.

3. The inverter as specified in claim 2 wherein said source of direct current comprises apparatus for supplying a unipolarity voltage of variable magnitude, first control means for varying the magnitude of said voltage, and means including a series inductor for conducting current between said apparatus and said input terminals, said control means causing the magnitude of said voltage to be initially relatively low and subsequent to the commencement of alternate conduction by said odd and even elements raising the magnitude of said voltage to a predetermined normal level.

4. In a current source inverter comprising first, second, third and fourth unidirectional switching elements connected in a bridge configuration having first and second input terminals connected across a source of direct current and first and second output terminals connected across a subcircuit including a compensating capacitor in series with a tank load, said first element being connected between the first input terminal and the first output terminal, said second element being connected between the first output terminal and the second input terminal, said third element being connected between the second output terminal and the second input terminal and said fourth element being connected between the first input terminal and the second output terminal, an improved method of starting the inverter comprising the following steps, in sequence:

a. initially rendering said even numbered elements conductive in response to an ON command, whereupon direct current begins to flow through said even numbered elements and commences charging said compensating capacitor;

b. subsequently rendering said first and second element concurrently conductive, whereupon direct current begins flowing through said first and second elements and said fourth element ceases conducting; and c. thereafter, rendering said odd and even numbered elements alternately conductive at a desired frequency starting with said odd elements, whereupon the prior charge on said capacitor is effective for causing said second element to cease conducting when said odd numbered elements are first rendered conductive and whereupon alternating current flows through the load.

5. The method as specified in claim 4 wherein the second-mentioned step is performed when the magnitude of the voltage on the compensating capacitor attains a predetermined level and wherein the third-mentioned step is performed when the magnitude of the current flowing through the first and second elements attains a predetermined level.

* * * * *